Jan. 2, 1951  V. E. MATNER ET AL  2,536,198
REMOTE INDICATING SYSTEM AND
TRANSMITTER FOR USE THEREIN
Filed Dec. 10, 1947
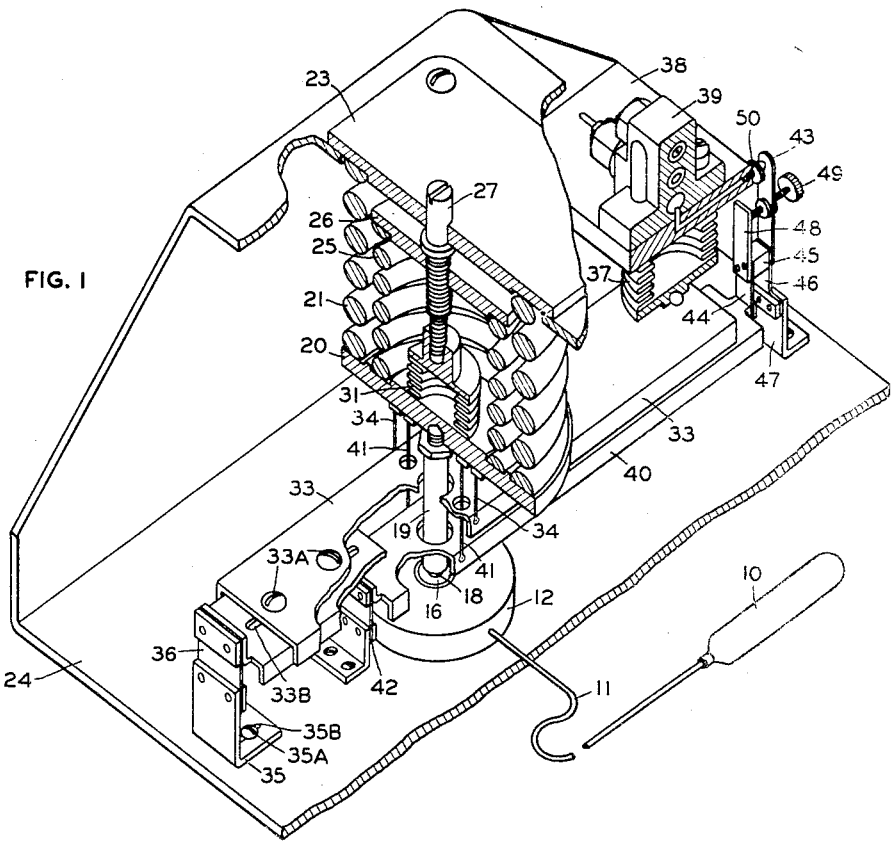
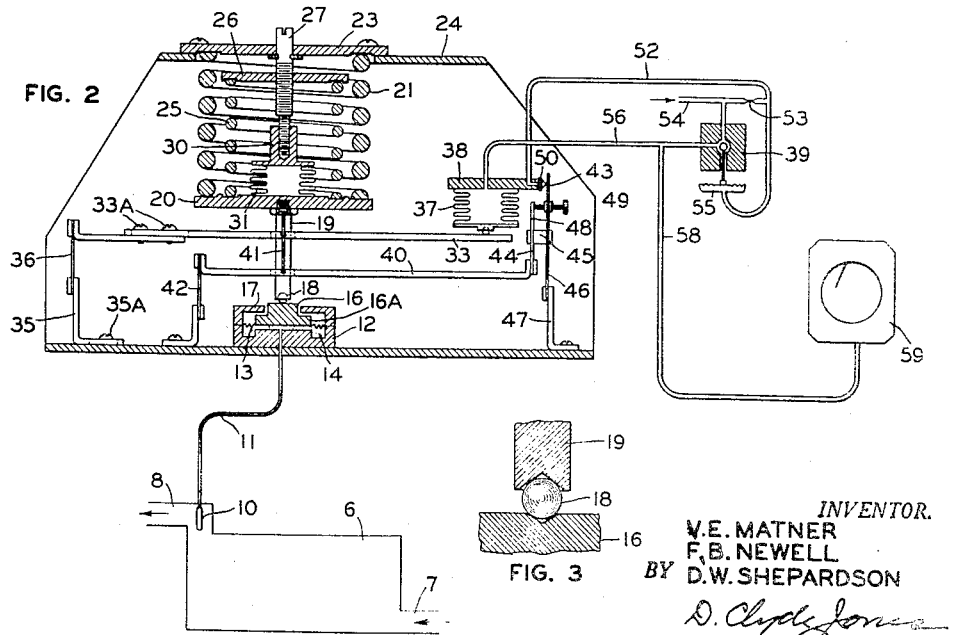
INVENTOR.
V. E. MATNER
F. B. NEWELL
BY D. W. SHEPARDSON
D. Clyde Jones
ATTORNEY Patented Jan. 2, 1951

2,536,198

UNITED STATES PATENT OFFICE 2,536,198

REMOTE INDICATING SYSTEM AND TRANSMITTER FOR USE THEREIN

Vincent E. Matner, Floyd B. Newell, and Donald W. Shepardson, Rochester, N. Y., assignors to Taylor Instrument Companies, Rochester, N. Y., a corporation of New York Application December 10, 1947, Serial No. 790,776

8 Claims. (Cl. 137—153)

This invention relates to a remote indicating system as well as to a transmitter for use therein, whereby the value of a variable condition prevailing at a given point is simultaneously indicated at a remote station.

The present invention has for its purpose, novel apparatus of the type described which provides improved accuracy and increased reliability.

The various features and advantages of the invention will appear from the detailed description and claims when taken with the drawings on which Fig. 1 is an air view of the transmitting portion of the present system; Fig. 2 is a diagrammatic showing of this system; and Fig. 3 is an enlarged detail view of a part of the apparatus of Fig. 1.

The transmitter of the present invention, although it is adapted to indicate at a remote point, changes in different variables such as temperature, pressure, force, liquid level, rate of flow, and the like, is herein illustrated as a temperature transmitter.

This transmitter is basically of the force-balance type and includes a temperature-sensitive system which produces a force that is a function of temperature. This transmitter also includes a sensitive motion-detecting means, together with a force-producing means which is controlled by the detecting means and develops a force that very nearly balances the force produced by the temperature-sensitive system. In the system used as an example, the temperature-sensitive means comprises a gas-filled bulb which develops and applies pressure through a capillary tube to a diaphragm chamber. Since the pressure in the system is a function of temperature, the force produced by the diaphragm is also a function of temperature. This diaphragm force is resisted by a force which consists of three components, namely (1) the force produced by a large fixed spring that balances the greater part of the diaphragm force; (2) the force produced by a smaller adjustable spring that balances part of the remainder of the diaphragm force and is used to change the working range to the desired value, in other words, to set the zero; and (3) the force produced by a bellows acting through a lever system. The force produced by the bellows is controlled by a baffle-nozzle-restriction type of motion detector together with a relay, and supplies the remaining amount of force required to complete the balance. There are other minor forces which have to be accounted for, such as the force of the nozzle air jet on the baffle; the change in force due to the effect of temperature upon the modulus of elasticity of the springs, upon the dimensions of the parts, and upon the part of the gas outside the bulb; the force of a small compensating bellows; and the force due to atmospheric pressure changes.

For the purpose of disclosure, the transmitter of the present invention is assumed to be used to transmit to a distant point, the indication of the temperature prevailing in a liquid bath contained in a tank 6. A circulating liquid is introduced into the tank by a pipe 7, and is discharged therefrom through the outlet pipe 8. The temperature of the bath is sensed by a thermosensitive tube system comprising a bulb 10, which communicates through a capillary tube 11, with a capsular unit 12, provided with a flexible diaphragm 13, to define an expansible chamber 14. The bulb 10 and capillary tube 11, as well as the chamber 14 are filled with a thermosensitive fluid which tends to expand or contract in response to an increase or decrease in temperature at the bulb 10. If the thermosensitive fluid is a gas and the volume of the bulb 10, capillary 11, and chamber 14 is not allowed to change appreciably, the gas can not expand or contract appreciably but its pressure increases with increasing temperature and decreases with decreasing temperature according to the well-known laws of gases. The flexible diaphragm 13 supports a rigid circular plate 16. This plate has an annular shoulder 16a which is adapted to be engaged by the margin 17 of the unit 12 to serve as a stop, in the event that the fluid within the tube system expands to the point where the diaphragm 13 would tend to be injured. The travel of the diaphragm downward when the gas pressure is reduced and the spring force is unchanged, is limited to a safe value by the lower wall of the chamber. The total travel of the diaphragm from its extreme lowest position to its extreme uppermost position is limited to but a few thousandths of an inch.

The top of the circular plate 16 supports a ball bearing 18 which allows angular motion of the rod 19 with respect to the plate 16, restricted only by the frictional forces. Any other type of flexible joint such as crossed pins or flexible strips could, or course, be used here. The upper end of this rod is screwed into the center portion of a disc 20. This disc is normally urged downward by a strong, coiled loading spring 21, having its lower end in contact with the upper surface of the disc, and having its upper end engaging the under surface of a cover 23, which is fastened across an opening in the frame 24 of the unit. The disc 20 is also forced downward by a weaker, zero-adjusting spring 25, arranged to have its lower end engage the upper surface of the disc 20. The upper end of the weak spring 25 engages the under surface of a washer 26, provided with an internally threaded aperture. The pressure exerted by the spring 25 is adjustable by means of a zero-adjusting screw 27, which engages an internally threaded opening in the center of the washer 26. It will be understood that by turning the zero-adjusting screw 27 in one direction, the compression of the spring 25 will be increased, whereas by turning the screw in the opposite direction, the compression of this spring will be reduced. From this it will be seen that while the pressure exerted by the coiled spring 21 on the circular plate 20 is fixed, the pressure exerted by the weak spring 25 can be adjusted at will.

The lower end of the screw 27 is also provided with relatively fine threads to engage the block 30, sealed to the top of the bellows 31. The bellows 31 is attached to the top of disc 20 in sealed relation thereto, being closed with air under predetermined pressure contained therein. This bellows provides barometric compensation of the pressure sensitive unit comprising the chamber 14, and also provides ambient temperature correction by inclusion in the bellows of the correct amount of dry air.

The force due to a change in atmospheric pressure acting on the top surface of the diaphragm 13 will be resisted by the force due to the same pressure acting on the bottom surface of the bellows 31, and if the effective areas of these surfaces are equal, the forces will be equal and opposite and therefore tend to cause no movement. Furthermore, as the ambient temperature of the instrument increases, the force of the springs 21 and 25 becomes less, due to the decrease in the modulus of elasticity of the spring material. Also as the temperature increases the force due to the air in the bellows increases. Therefore by the selection of the proper amount of air in the bellows, these effects of temperature can be made to balance. In fact, the force exerted by the bellows 31 can be made to balance all temperature effects on the instrument at any particular selected value of the bulb temperature.

When the force exerted by the spring 25 is increased, however, to increase the minimum temperature of the range, the change in force due to a change in temperature is increased and the instrument is no longer compensated. Provision can, however be made for increasing the pressure of air in the bellows 31 at the same time, just enough to furnish the extra force and make compensation complete. Therefore, the lower screw 27 is also provided with a second threaded section of a different pitch to engage block 30. Then as the range is shifted, the compensation action is changed as required. It should be pointed out that the different sized threads on the screw 27 are such that the ratio of the pitches of the differential zero-adjusting screw is so arranged that by increasing the load exerted by the zero-adjusting spring, the sealed bellows 31 is likewise compressed to a point where the increased pressure of the included dry air compensates the transmitter for ambient temperature in the new temperature range. Also, by turning the differential zero-adjusting screw 27, the transmitter can be made to measure temperatures at different starting points or ranges and can be automatically compensated for ambient temperature changes.

Another force is applied to the system by the bellows 37 through the lever of force beam 33 and wires 34 which are attached to the beam 33 and to the disc 20. The beam 33 has its left end pivotally supported on the frame of the instrument by means of the leaf hinge 36. This hinge is supported on the angle bracket 35 which is mounted to the frame or base plate 24 by means of screws 35A movable in the slots 35B. The beam 33 is made in two parts which are held together by the screws 33A extending through the slot 33B so that the length of the beam can be changed at will. When the length is changed, this extension of the beam 33, the leaf hinge 36, and bracket 35 are moved. This adjustment sets the amount of output pressure change per unit of temperature change, that is, it sets the span of the transmitter. The upper surface of the right end of the force beam 33 is engaged by the movable end of a bellows 37 having its upper end sealed to a fixed supporting bracket 38. This bellows is supplied with compressed air from the output of a relay valve 39 as will be hereinafter described. The span of the transmitter can also be changed by changing the initial pressure to which the bulb 10 is filled.

The force applied to the disc 20 is also communicated to a motion beam 40 by a second pair of flexible transmitting wires 41 respectively connected to this disc and to the motion beam. Motion beam 40 has its left end pivotally supported on the frame of the instrument by means of the leaf hinge 42, so that the force beam 33 and motion beam 40 extend in the same direction preferably in nested relation as shown in Fig. 1. The right end of the motion beam 40 is provided with a motion amplifier including a baffle 43 by which a relatively small motion of the right end of beam 40 effects a relatively large motion of the free upper end of the baffle. The motion amplifier comprises a flexible strip 44 having its lower end attached to the right end of beam 40 and having its upper end secured to a rigid block 45. This block in turn is fixed on the upper end of a flexible strip 46 which has its lower end fixed to a bracket 47 mounted on the frame of the instrument.

The baffle 43 is fastened to the block 45 in superimposed relation with the strip 46, although these two parts are shown diagrammatically as one piece in Fig. 2. The block 45 has a rigid strip 48 secured thereto in superimposed relation to the flexible strip 44, although these two strips are likewise illustrated as one piece in Fig. 2. The baffle has a set screw 49, adjustably threaded therein so that the free end of this screw engages the rigid strip 48. By this arrangement, the relation of the baffle 43 with respect to the fixed nozzle 50 can be manually adjusted at will.

The nozzle 50 communicates through tube 52 and constriction 53, with a compressed air supply pipe 54, in accordance with the well-known practice. Tube 52 communicates with the capsular chamber 55 of a well-known type of relay valve 39. It will be understood that the relay valve 39 controls the application of compressed air from supply pipe 54 to conduit 56 which communicates with the interior of bellows 37. In this construction, the relay 39 opens or closes as the case may be, until air pressure in bellows 37 exerts a force on the load beam 33 that balances the force on this load beam as a result of the expansion or contraction of the chamber 14, in response to a change in temperature at the bulb 10.

It will be noted that a branch 58 of conduit 56 communicates with the Bourdon spring (not shown) of an instrument 59 at a distant point. This instrument, which may be similar to that shown in the Tate et al. Patent 2,361,885, is herein calibrated in terms of temperature.

Briefly, the operation of the transmitter is as follows: Let it be assumed that the temperature at the bulb 10 rises, thereby causing the thermosensitive medium in the tube system to expand with the consequent slight elevation of diaphragm 13 as well as plate 16, rod 19, and disc 20. The upward movement of the disc 20 raises the flexible wires 41 which in turn swing the motion beam 40 upward about its hinge 42 a slight amount. This upward motion of the beam 40 is amplified in the motion amplifier to effect a correspondingly larger movement of the baffle 43 away from the nozzle 50. This causes the back pressure at the nozzle to drop with the result that the capsular chamber 55 tends to contract, thereby tending to open the relay valve 39 a small amount. This supplies an increased pressure to the bellows 37. As the pressure in the bellows 37 increases, the force on beam 33, wires 34, and stud 19 increases, tending to force the diaphragm back to its original position and thus limit its motion.

It should be pointed out that the two lever systems, namely the force beam 33 and the motion beam 40 are kept separate so that the deflections due to changes in the force on the force beam will not affect the position of the baffle.

In the ultimate state of equilibrium of the device after a change in temperature, the force applied upward to the bottom of the bellows 37 will be balanced by the downward force on the bottom of the bellows as a result of the increased air pressure in the outlet conduit 56 of the relay valve 39, as described above. Since the branch conduit 58 leads from the outlet conduit 56 to the remote indicating instrument, the air pressure in the conduits when the mentioned forces in the bottom of the bellows 37 are balanced, will actuate the remote instrument 59 to indicate the temperature at the bulb 10. A drop in temperature at the bulb 10 will cause the mechanism to operate in the same manner but in the reverse sense.

What we claim is:

1. In a device of the class described, means including a diaphragm for developing forces corresponding to changing pressures to be measured, a force beam actuated by forces developed by said diaphragm, a pressure-operated motor engaging said force beam to apply thereto forces tending to oppose those developed by said diaphragm, a motion beam actuated by said diaphragm independently of said force beam, a pressure fluid source, means including a pressure controlling device responsive to the action of said motion beam for applying to the pressure-operated motor, fluid from said source at a pressure proportional to the movement of said motion beam, and mechanism at a remote point actuated in accordance with said applied pressure.

2. In a device of the class described, a member for applying forces corresponding to a changing variable to be measured, means tending to oppose said forces with a force which is proportional to the ambient atmospheric pressure, a pressure fluid operated device for applying another force also tending to oppose said applied forces, mechanism actuated by said member independently of said pressure fluid operated device for detecting any unbalance between said opposing forces, a source of pressure fluid, means including said detecting mechanism for applying pressure fluid from said source to said device at a pressure proportional to the detected unbalance whereby said forces are substantially balanced, and an instrument actuated in accordance with the pressure of the applied fluid.

3. In a device of the class described, means including a diaphragm for developing forces corresponding to a changing variable to be measured, means opposing said forces with a force which is proportional to the ambient atmospheric pressure, a force beam actuated by said diaphragm, a pressure fluid operated motor engaging said force beam to apply thereto forces tending to oppose those developed by said diaphragm, a motion beam actuated by said diaphragm independently of said force beam, a pressure fluid source, a motion detecting mechanism for detecting the amount of movement of said motion beam due to any unbalance between said forces, means including said detecting mechanism for controlling the magnitude of the pressure applied from said source to said pressure fluid operated means in accordance with the detected motion of said motion beam whereby said forces are substantially balanced, and an instrument actuated in response to changes in the applied pressure.

4. In a device of the class described, responsive means for developing forces corresponding to a changing variable to be measured, a force beam actuated by forces developed by said responsive means, a pressure fluid operated motor engaging said force beam for applying thereto a force tending to oppose the forces corresponding to the changing variable, a motion beam actuated by said responsive means independently of said force beam, a source of pressure fluid, means including said motion beam for applying to said motor, fluid from said source at a pressure which is a function of the changing variable, whereby said pressure motor applies to said force beam a force effectively equal and opposite to that applied to said force beam by said responsive means, and an instrument actuated in accordance with said last mentioned force.

5. In a device of the class described, means for developing forces corresponding to a changing variable to be measured, adjustable mechanism for applying a selected force opposing said first mentioned forces, means for supplying a pneumatically-controlled force opposing said first-mentioned forces, mechanism responsive to ambient temperatures serving also to apply forces corresponding to said temperatures, in opposition to said first-mentioned forces, a manually adjustable element for simultaneously adjusting both of said mechanisms to compensate for ambient temperature variations in the mentioned parts of the device at the selected force, means for detecting any unbalance between said first-mentioned forces and the remaining forces, mechanism responsive to any unbalance detected by said detecting means for controlling the magnitude of the pneumatically-controlled force proportionally to the detected unbalance, and an instrument actuated in accordance with the pneumatically controlled forces.

6. In a device of the class described, a diaphragm for developing forces corresponding to changing pressures to be measured, a hinged force beam actuated in response to forces developed by said diaphragm, a pressure operated motor engaging said force beam to apply thereto forces tending to oppose those developed by said diaphragm, an independently supported motion beam extending in the same general direction as the force beam, said motion beam being actuated by said diaphragm independently of said force beam, a pressure fluid source, a pressure controlling device including a baffle-nozzle couple controlled by said motion beam for applying to the pressure-operated motor fluid from said source at a pressure which will substantially balance the forces developed by the diaphragm, and an instrument actuated in accordance with the applied pressure.

7. In a device of the class described, a force beam, means including a diaphragm for developing and applying forces to said force beam corresponding to changing fluid pressures to be measured, manually adjustable means including a pressure responsive element for applying a force to said diaphragm tending to oppose said first mentioned forces, said pressure responsive element having an area effectively equal to that of the diaphragm, whereby barometric pressure compensation of said diaphragm is effected, said pressure responsive element having therein a gas at such a pressure that the forces due to changes in ambient temperature are also effective to change the volume of said pressure element, whereby, as the force due to the manual adjustment is changed the effect of temperature on said volume is necessarily changed also, so that the amount of temperature compensating effect is simultaneously changed to keep the system compensated for ambient temperature changes, pneumatic pressure responsive means for applying forces to said force beam in opposition to said first mentioned forces, a motion beam for detecting any unbalance between the first mentioned forces and the opposing forces, a source of compressed air, a baffle-nozzle type of relay actuated by the motion of said motion beam and having an output in which air from said source is supplied at a controlled pressure, a pilot relay actuated in response to said controlled pressure for applying compressed air from said source to said pneumatic pressure-responsive element at a pressure change corresponding to said controlled pressure, and an instrument actuated in accordance with the applied pressure.

8. In a device of the class described, a force responsive unit including a force beam, means for applying to said force unit forces corresponding to a changing variable to be measured, means for applying a manually adjustable force to said force unit in opposition to said first mentioned forces, mechanism for applying to said force unit through said force beam pneumatically-controlled forces also in opposition to said first mentioned forces, means for applying to said force unit ambient temperature-controlled forces to modify the manually-controlled opposing force as the ambient temperature changes, means acting independently of the force beam for detecting any unbalance between the mentioned forces, means including said detecting means controlling the magnitude of the pneumatically-controlled opposing forces proportionally to the detected unbalance whereby said forces are substantially balanced, and an instrument actuated in accordance with pneumatically controlled forces.

VINCENT E. MATNER.
FLOYD B. NEWELL.
DONALD W. SHEPARDSON.

REFERENCES CITED

The following references are of record in the file of this patent:

UNITED STATES PATENTS

| Number | Name | Date |
|---|---|---|
| 1,369,090 | Dunn | Feb. 22, 1921 |
| 1,439,750 | Nelson | Dec. 26, 1922 |
| 1,624,995 | Stimpson | Apr. 19, 1927 |
| 2,044,729 | Eggleston | June 16, 1936 |
| 2,061,118 | Vogt | Nov. 17, 1936 |
| 2,240,243 | Mason | Apr. 29, 1941 |
| 2,419,825 | Dinerstein | Apr. 29, 1947 |
| 2,441,044 | Tate | May 4, 1948 |